US011488328B2

(12) United States Patent
Chan et al.

(10) Patent No.: US 11,488,328 B2
(45) Date of Patent: Nov. 1, 2022

(54) AUTOMATIC DATA FORMAT DETECTION

(71) Applicants: Advanced Micro Devices, Inc., Santa Clara, CA (US); ATI Technologies ULC, Markham (CA)

(72) Inventors: Anthony Chan, Markham (CA); Nooruddin Ahmed, Markham (CA); Christopher J. Brennan, Boxborough, MA (US); Bernard T. K. Chan, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 181 days.

(21) Appl. No.: 17/085,851

(22) Filed: Oct. 30, 2020

(65) Prior Publication Data

US 2022/0101563 A1 Mar. 31, 2022

Related U.S. Application Data

(60) Provisional application No. 63/083,620, filed on Sep. 25, 2020.

(51) Int. Cl.
*G06T 9/00* (2006.01)
*G06F 17/15* (2006.01)
*G06T 15/00* (2011.01)

(52) U.S. Cl.
CPC .............. *G06T 9/001* (2013.01); *G06F 17/15* (2013.01); *G06T 15/005* (2013.01)

(58) Field of Classification Search
None
See application file for complete search history.

(56) References Cited

U.S. PATENT DOCUMENTS

| 5,930,390 A | 7/1999 | Coelho |
| 6,524,198 B2 | 2/2003 | Takeda |
| 6,618,397 B1 | 9/2003 | Huang |

(Continued)

OTHER PUBLICATIONS

International Search Report and Written Opinion in International Application No. PCT/IB2018/057511, dated Jan. 22, 2019, 8 pages.

(Continued)

*Primary Examiner* — Anand P Bhatnagar
(74) *Attorney, Agent, or Firm* — Kowert Hood Munyon Rankin and Goetzel PC; Rory D. Rankin (57) ABSTRACT

Systems, apparatuses, and methods for implementing automatic data format detection techniques are disclosed. A graphics engine receives data of indeterminate format and the graphics engine predicts an organization of the data. As part of the prediction, the graphics engine predicts the pixel depth (i.e., bytes per pixel (BPP)) and format separately. The graphics engine folds the data along pixel and channel boundaries to help in determining the pixel depth and format. The graphics engine scores modes against each other to generate different predictions for different formats. Then, the graphics engine generates scores for the predictions to determine which mode has a highest correlation with the input data. Next, the graphics engine chooses the format which attains the best score among the scores that were generated for the different modes. Then, the graphics engine compresses the unknown data using the chosen format with the best score.

20 Claims, 11 Drawing Sheets

(56) References Cited

U.S. PATENT DOCUMENTS

| | | |
|---|---|---|
| 6,680,976 B1 | 1/2004 | Chen et al. |
| 6,683,988 B1 | 1/2004 | Fukunaga et al. |
| 6,754,234 B1 | 6/2004 | Wiesner et al. |
| 7,471,823 B2 | 12/2008 | Ubillos et al. |
| 7,526,029 B2 * | 4/2009 | Roman ............... H04N 19/59 375/240.23 |
| 7,813,000 B2 | 10/2010 | Ternasky et al. |
| 7,813,822 B1 * | 10/2010 | Hoffberg ............. H04N 7/163 381/73.1 |
| 8,175,181 B1 | 5/2012 | Nabar et al. |
| 8,176,118 B2 * | 5/2012 | Nagasaka ............ G06F 16/60 709/200 |
| 8,861,876 B2 * | 10/2014 | Kim ................. H04N 19/186 382/232 |
| 9,270,969 B2 | 2/2016 | Hong et al. |
| 9,407,923 B2 | 8/2016 | Barak |
| 9,478,069 B2 * | 10/2016 | Strom .................. G06T 19/20 |
| 9,924,134 B2 | 3/2018 | Glen |
| 10,594,901 B2 | 3/2020 | Sines et al. |
| 11,100,604 B2 | 8/2021 | Cheng et al. |
| 2001/0033286 A1 | 10/2001 | Stokes et al. |
| 2005/0223165 A1 | 10/2005 | Schmidt et al. |
| 2006/0067408 A1 * | 3/2006 | Roman ............... H04N 19/93 375/240.23 |
| 2006/0171596 A1 | 8/2006 | Sung et al. |
| 2008/0049651 A1 | 2/2008 | Chang et al. |
| 2009/0052537 A1 | 2/2009 | Burazerovic et al. |
| 2009/0148058 A1 | 6/2009 | Dane et al. |
| 2009/0213940 A1 | 8/2009 | Steinbach et al. |
| 2010/0050225 A1 | 2/2010 | Bennett |
| 2010/0157154 A1 | 6/2010 | Kobayashi et al. |
| 2011/0050695 A1 | 3/2011 | Sullivan et al. |
| 2011/0066262 A1 | 3/2011 | Kelly et al. |
| 2011/0157196 A1 | 6/2011 | Nave et al. |
| 2011/0263332 A1 | 10/2011 | Mizrachi |
| 2011/0299606 A1 | 12/2011 | Chen et al. |
| 2012/0008679 A1 | 1/2012 | Bakke |
| 2012/0185566 A1 * | 7/2012 | Nagasaka ............ G06F 16/60 709/217 |
| 2012/0236934 A1 | 9/2012 | Chen et al. |
| 2012/0243009 A1 | 9/2012 | Chapman et al. |
| 2013/0039594 A1 | 2/2013 | Chen et al. |
| 2013/0053141 A1 | 2/2013 | Guerin et al. |
| 2013/0058394 A1 | 3/2013 | Nilsson et al. |
| 2013/0076771 A1 | 3/2013 | Bachman et al. |
| 2013/0083161 A1 | 4/2013 | Hsu et al. |
| 2013/0335432 A1 | 12/2013 | Iwasaki |
| 2014/0028876 A1 | 1/2014 | Mills |
| 2014/0194196 A1 | 7/2014 | Hoy et al. |
| 2014/0211860 A1 | 7/2014 | Zhao et al. |
| 2014/0267780 A1 * | 9/2014 | Spears ................ H04N 17/02 348/181 |
| 2014/0317068 A1 | 10/2014 | Yang et al. |
| 2014/0327668 A1 * | 11/2014 | Strom ................. G06T 9/00 345/419 |
| 2014/0376612 A1 | 12/2014 | Chen et al. |
| 2016/0381392 A1 | 12/2016 | Wiegand et al. |
| 2017/0142447 A1 * | 5/2017 | Toth ................. H04N 19/154 |
| 2018/0091819 A1 | 3/2018 | Cook et al. |
| 2019/0052284 A1 * | 2/2019 | Itani ................. H03M 7/40 |
| 2019/0068983 A1 | 2/2019 | Ryan et al. |
| 2019/0104311 A1 | 4/2019 | Amer et al. |
| 2019/0182308 A1 | 6/2019 | Vu et al. |
| 2020/0394458 A1 * | 12/2020 | Yu ..................... G06V 10/25 |

OTHER PUBLICATIONS

Non-Final Office Action in U.S. Appl. No. 15/686,892, dated Mar. 7, 2019, 14 pages.

Non-Final Office Action in U.S. Appl. No. 15/834,400, dated Feb. 27, 2019, 16 pages.

Final Office Action in U.S. Appl. No. 15/834,400, dated Jul. 10, 2019, 15 pages.

Non-Final Office Action in U.S. Appl. No. 15/721,078, dated Jan. 31, 2019, 9 pages.

* cited by examiner

| Format Table 500 | 1BPP 505 | 2BPP 510 | 4BPP_8888_CT 515 | 4BPP_8888 520 | 4BPP_210101010_CT 525 | 4BPP_1010102_CT 530 | 4BPP_11110_CT 535 | 4BPP_101111_CT 540 | 8BPP_16161616_CT 545 | 8BPP_16161616 550 |
|---|---|---|---|---|---|---|---|---|---|---|
| | | | | | | | | | | |

FIG. 5

Format Table 600

| | | | | | | | | | | |
|---|---|---|---|---|---|---|---|---|---|---|
| FMT_8 | FMT_8_8 | FMT_8_8_8_8 | FMT_16_16_16_16 | FMT_5_6_5 | FMT_1_5_5_5 | FMT_5_5_5_1 | FMT_10_11_11 | FMT_11_11_10 | FMT_2_10_10_10 | FMT_10_10_10_2 |
| 605 | 610 | 615 | 620 | 625 | 630 | 635 | 640 | 645 | 650 | 655 |

AUTOMATIC DATA FORMAT DETECTION

CROSS REFERENCE TO RELATED APPLICATIONS

This application claims priority to Provisional Patent Application Ser. No. 63/083,620, entitled "AUTOMATIC DATA FORMAT DETECTION", filed Sep. 25, 2020, the entirety of which is incorporated herein by reference.

BACKGROUND

Description of the Related Art

Graphics engines are often used within computer graphics processing systems to create computer-generated imagery from a geometric model. A geometric model defines various objects, details, lighting sources, and other elements of a virtual scene. The graphics engine determines how to render a given scene based on the geometric model and other inputs from a software application. These inputs include graphical objects such as points, lines, polygons, three dimensional solid objects, and other objects.

A graphics engine receives source graphics data from many sources. The source graphics data can be surfaces, textures, and the like. This source graphics data is used by the graphics engine to render a given scene. In some cases, the graphics engine receives unformatted source graphics data where the format of the graphics data is unknown. Unformatted data (i.e., type-less data) refers to data formats where data organization is undefined or unknown. When the graphics engine does not know the format of the graphics data, the graphics engine can have difficulty using and/or compressing the graphics data.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing automatic data format detection techniques are disclosed. In one implementation, a graphics engine receives unformatted data and the graphics engine predicts an organization of the data. As part of the prediction, the graphics engine predicts the pixel depth (i.e., bytes per pixel (BPP)) and format separately. The graphics engine folds the data along pixel and channel boundaries to help in determining the pixel depth and format. The graphics engine scores modes against each other to generate different predictions for different formats. Then, the graphics engine generates scores for the predictions to determine which mode has a highest correlation with the input data. Next, the graphics engine chooses the format which attains the best score among the scores that were generated for the different modes. Then, the graphics engine compresses the unknown data using the chosen format with the best score.

Figure 1:
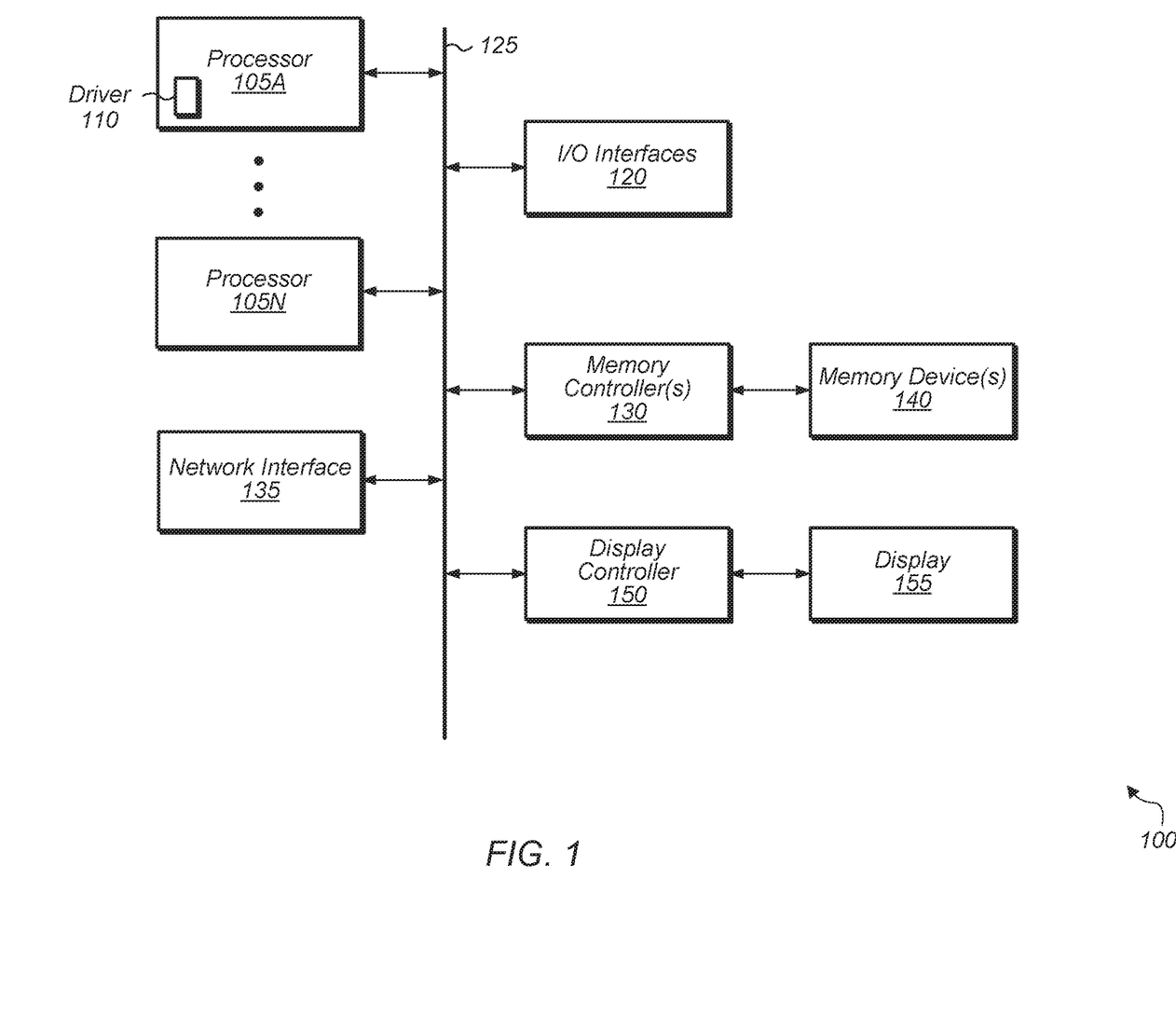
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
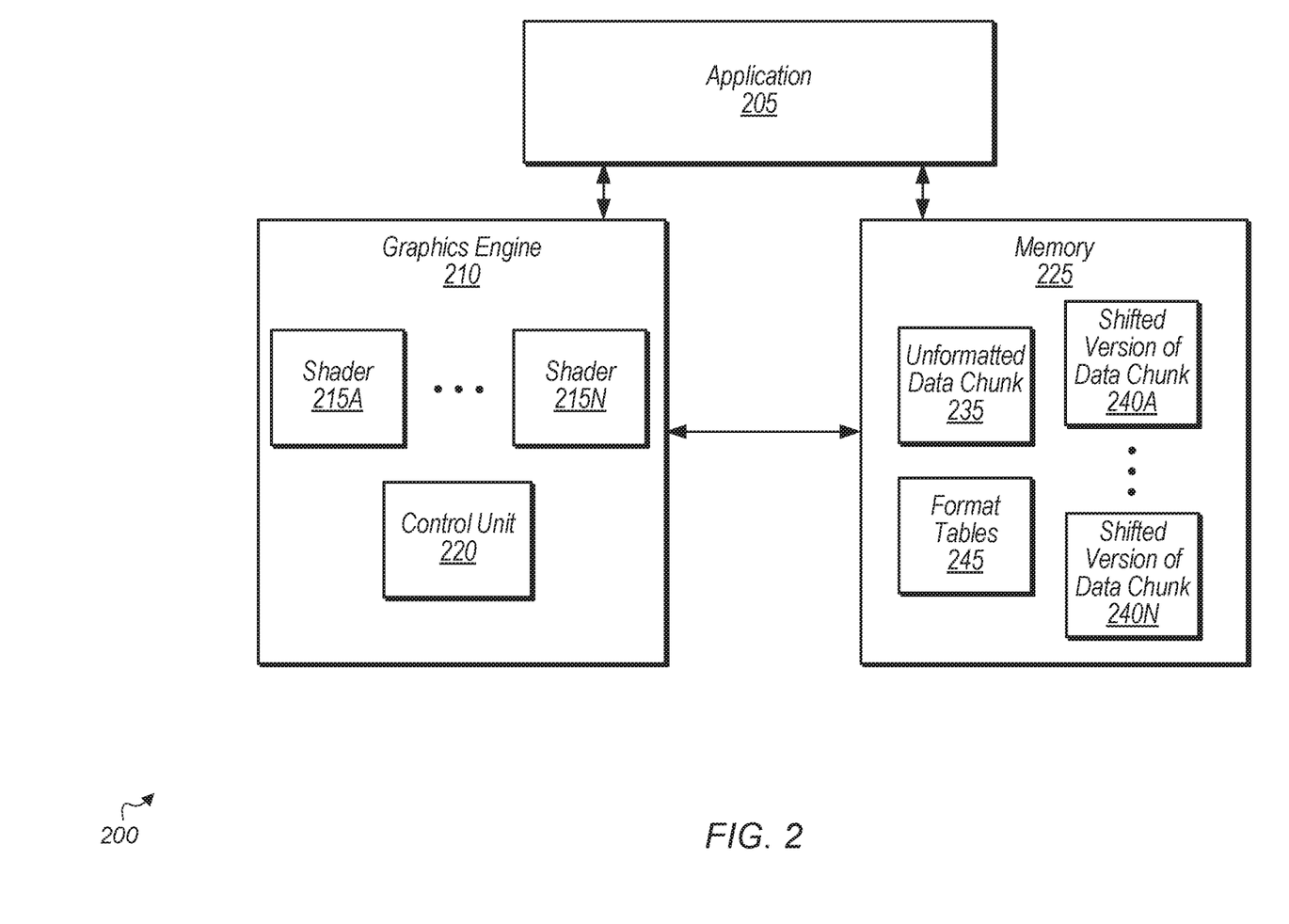
FIG. 2 is a logical block diagram of one implementation of a system for rendering graphics.

Turning now to FIG. 2, a logical block diagram of one implementation of a system 200 for rendering graphics is shown. In one implementation, system 200 includes components such as graphics engine 210, application 205, and memory 225. Graphics engine 210 include at least shaders 215A-N and control unit 220. Shaders 215A-N are representative of any number and type of shaders (e.g., geometry shader, light shader, pixel shader). Graphics engine 210 can be implemented using at least a portion of one or more CPUs, GPUs, FPGAs, ASICs, DSPs, and/or other processing resources. It is noted that system 200 can also include any number and type of other components, with the other components varying from implementation to implementation. In one implementation, application 205 is a graphics application for rendering pixels to represent scenes of a video game, movie, or other application. In one implementation, application 205 includes program instructions which are stored in memory 225 and which execute on graphics engine 210. Application 205 can run on a general-purpose processor or on fixed hardware such as a FPGA or ASIC. Similarly, shaders 215A-N can be implemented using any suitable combination of software and/or hardware.

In one implementation, graphics engine 210 processes unformatted data chunk 235 while performing rendering associated with a game, video, or compute sequence. As used herein, the term "data chunk" is defined as a collection of data. The collection of data can be referenced using a pointer, a buffer, or otherwise. The size of a data chunk can vary according to the implementation. It is noted that "unformatted data chunk 235" can also be referred to as "type-less data chunk 235".

It is assumed for the purposes of this discussion that graphics engine 210 does not have information regarding the format of data chunk 235. In this scenario, graphics engine 210 performs various operations to predict the format of data chunk 235. As part of these operations, in one implementation, graphics engine 210 generates shifted versions of data chunk 235 and then graphics engine 210 measures the correlation of these shifted versions with the original data chunk 235. The shifted versions are shown as being stored in memory 225 as shifted version of data chunk 240A and shifted version of data chunk 240N. Shifted versions of data chunks 240A-N are representative of any number of shifted versions of unformatted data chunk 235. For example, in one implementation, unformatted data chunk 235 is shifted by one byte to create a first shifted version, unformatted data chunk 235 is shifted by two bytes to create a second shifted version, and so on.

In one implementation, the number of shifted versions of data chunks 240A-N that are created is based on the formats listed in a given table of format tables 245. In one implementation, each table of format tables 245 includes a list of formats that should be tested against for any unformatted data chunks that are processed. In one implementation, for each format that is being checked, a different shifted version of data chunk 240A-N can be created. Format tables 245 include one or most tables specifying any number and type of formats, with the number and type varying according to the implementation.

For each shifted version 240A-N, a correlation between the shifted version 240A-N and the original unformatted data chunk 235 is measured. For example, in one implementation, a bitwise XOR operation is performed between each shifted version 240A-N and the original unformatted data chunk 235. The resultant output is stored for each bitwise XOR operation. In one implementation, the resultant output with the lowest number of 1 bits is deemed to be the closest correlation between shifted versions and the unformatted data chunk 235. The shifted version that is deemed the closest correlation is then used to determine the likely format for unformatted data chunk 235. For example, if a shift of four bytes created the shifted version that is most closely correlated with the original unformatted data chunk 235, then graphics engine 210 predicts that the unformatted data chunk 235 has four bytes per pixel. It is noted that other similar techniques can be used to determine other characteristics of unformatted data chunk 235. These other techniques will be described in more detail throughout the remainder of this disclosure.

Figure 3:
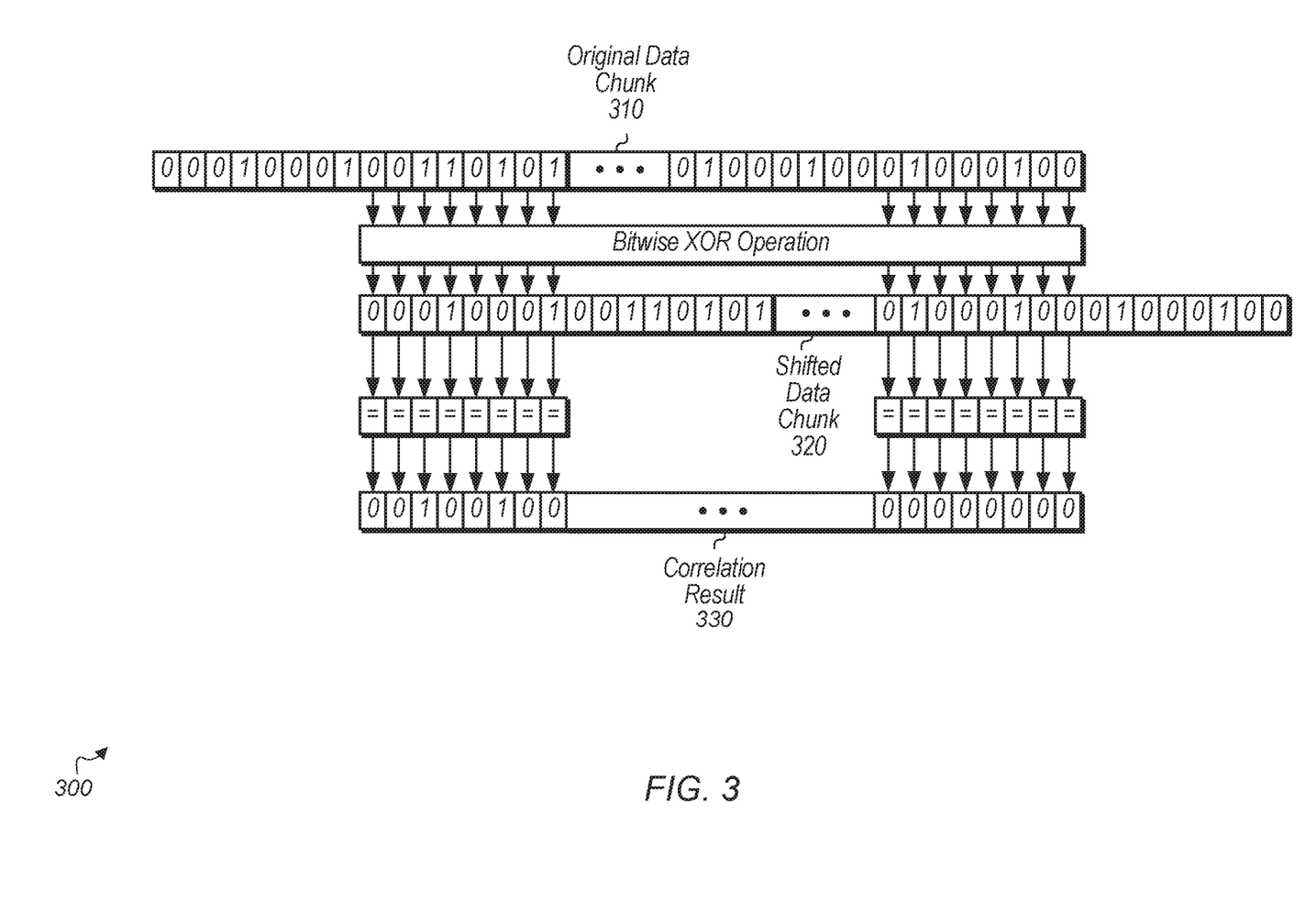
FIG. 3 is a diagram of one implementation of a data folding operation.

Referring now to FIG. 3, a diagram of one implementation of a data folding operation 300 is shown. Original data chunk 310 is representative of a data chunk in which the specific format of the data chunk is unknown to the graphics engine (e.g., graphics engine 210 of FIG. 2) responsible for processing the data chunk. While original data chunk 310 represents an unformatted data chunk of any size, the first two bytes and the last two bytes of original data chunk 310 are shown in FIG. 3 to illustrate the data folding operation 300.

Data folding operation 300 illustrates the folding (i.e., shifting) of original data chunk 310 by one byte. In other words, shifted data chunk 320 represents original data chunk 310 shifted by one byte. In one implementation, a bitwise XOR operation is performed between original data chunk 310 and shifted data chunk 320 to generate correlation result 330. However, in other implementations, other types of transform operations can be performed between the original and shifted data chunks to generate a correlation result. After generating correlation result 330, the graphics engine will compare correlation result 330 to the other correlation results between other shifted versions and original data chunk 310. For example, the other shifted versions can include a 2-byte shifted version, a 3-byte shifted version, a 4-byte shifted version, and so on. It is noted that other shifts can be performed that are not in byte increments, such that a 10-bit shifted version, a 12-bit shifted version, a 14-bit shifted version, and so on can be tested.

When comparing correlation results, any type of comparison can be used to select the correlation with the "highest score". For example, in one implementation, the "highest score" is the correlation result with the lowest number of "1" bits. In other implementations, other ways of comparing the correlation results can be used to determine which correlation result has the "highest score" or "best score".

Figure 4:
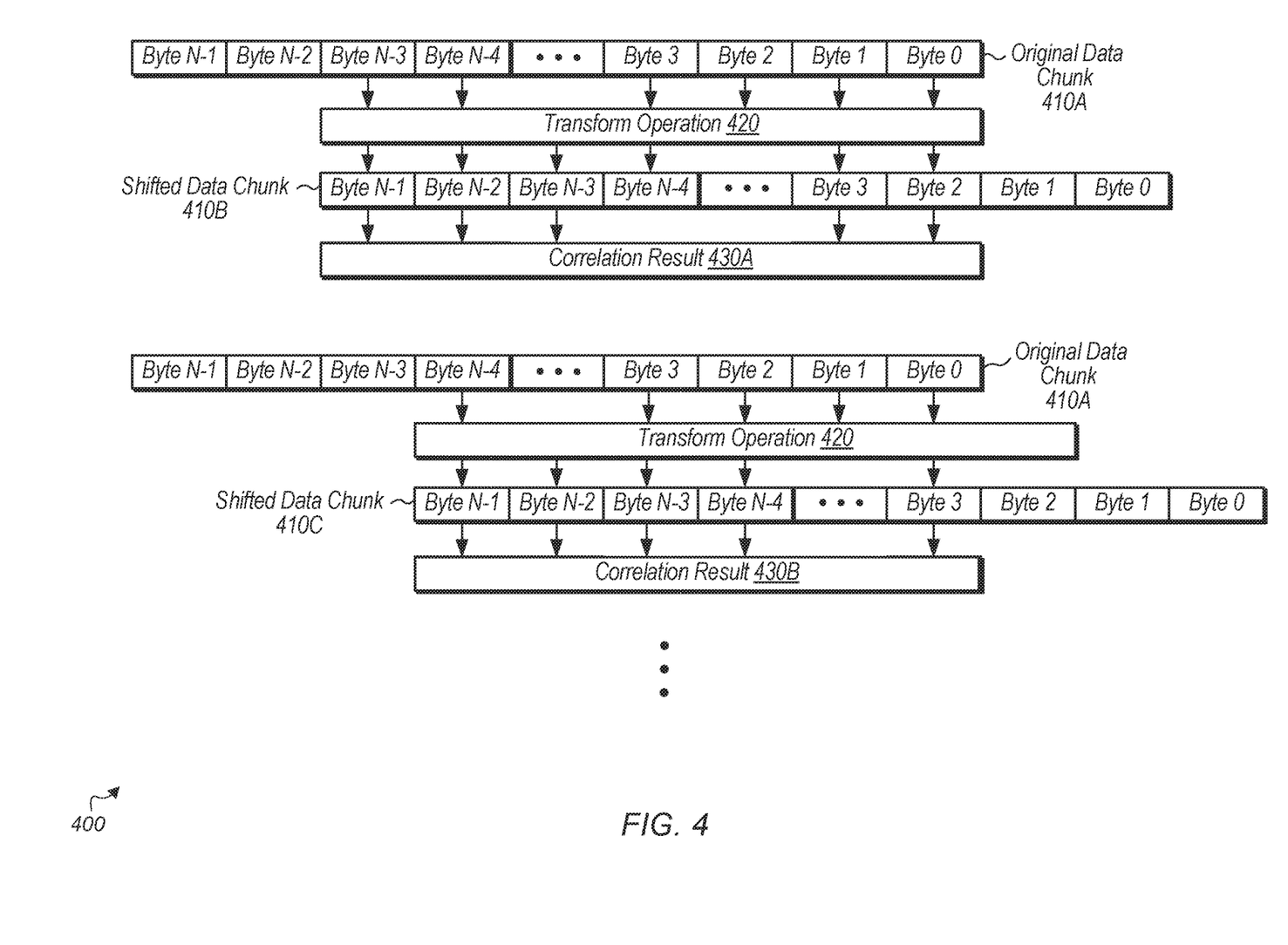
FIG. 4 is a diagram of one implementation of generating correlation results for different shifts of a data chunk.

Turning now to FIG. 4, a diagram of one implementation of generating correlation results for different shifts of a data chunk is shown. In one implementation, a graphics engine (e.g., graphics engine 210 of FIG. 2) receives original data chunk 410A which has an unknown format. Original data chunk 410A has any number of bytes N, with N varying according to the size of each different data chunk processed by the graphics engine. In order to determine the format of original data chunk 410, the graphics engine performs multiple different shifts of original data chunk 410A while capturing the correlation results of each shift. Examples of two different correlation results 430A-B are shown in FIG. 4. The graphics engine can perform any number of shifts and generate any number of correlation results, with the number varying according to the implementation.

As shown at the top of FIG. 4, shifted data chunk 410B is shifted by two bytes from the original data chunk 410A. A transform operation 420 is applied between original data chunk 410A and shifted data chunk 410B. Because of the shift, the transform operation 420 will be applied between byte 0 of original data chunk 410A and byte 2 of shifted data chunk 410B, between byte 1 of original data chunk 410A and byte 3 of shifted data chunk 410B, and so on up to byte N−3 of original data chunk 410A and byte N−1 of shifted data chunk 410B.

In one implementation, transform operation 420 is an XOR operation. In another implementation, transform operation 420 is a color transform. Any type of color transform can be used by the graphics engine. For example, in one implementation, the color transform involves performing a first XOR operation between the expected locations of the red and green pixel component values and performing a second XOR operation between the expected locations of the blue and green pixel component values. Other types of color transforms can be used in other implementations. In some implementations, transform operation 420 combines two or more operations such as an XOR operation and a color transform.

After performing transform operation 420 between original data chunk 410A and shifted data chunk 410B, correlation result 430A is generated. The graphics engine performs a similar transform operation 420 between original data chunk 410A and shifted data chunk 410C to generate correlation results 430B, as shown at the bottom of FIG. 4. Shifted data chunk 410C is created by shifting original data chunk 410A by three bytes. The graphics engine can create any number of different shifted data chunks by shifting original data chunk 410A by different amounts. The graphics engine will create a different correlation result for each different shifted data chunk. After all of the correlation results are generated, the graphics engine will select the correlation result with the highest score. The graphics engine will then predict that original data chunk 410A is formatted according to the specific format that generated the correlation result with the highest score.

Figure 5:
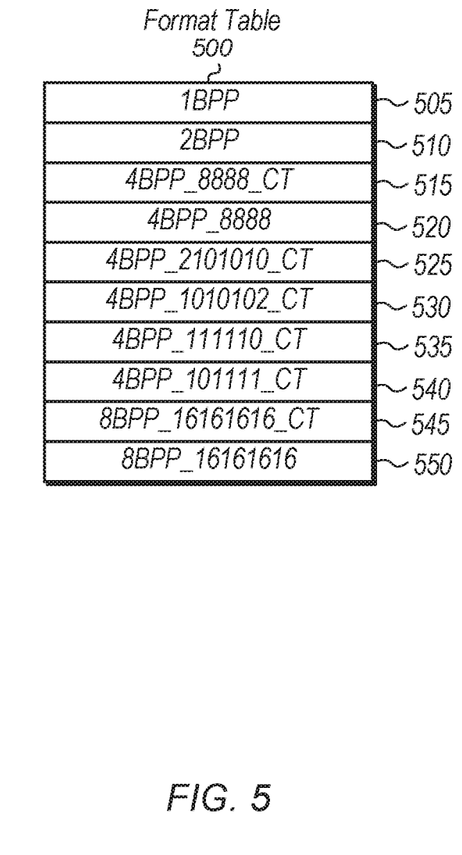
FIG. 5 is a format table in accordance with one implementation.

Referring now to FIG. 5, a format table 500 in accordance with one implementation is shown. In one implementation, format table 500 is loaded by a graphics engine (e.g., graphics engine 210 of FIG. 2) from a memory (e.g., memory 225 of FIG. 2) to be used for determining which formats to test for when processing a data chunk of unknown format. The different possible formats to be tested for are listed in format table 500. This list is representative of one particular implementation. In other implementations, the list of different possible formats can include other types and/or numbers of formats. In one implementation, format table 500 is included in format tables 245 (of FIG. 2). Any type of encoding can be used to encode a representation of the format in table 500.

As shown in FIG. 5, format table 500 includes entry 505 for the 1BPP format which has one byte per pixel component. Entry 510 corresponds to the 2BPP format which has two bytes per pixel component. Entry 515 lists the 4BPP_8888_CT format which has four bytes per pixel with one byte for each pixel component (Red, Green, Blue, Alpha) and a color transform (CT) encoding. In one implementation, the color transform involves performing an XOR operation between the red and green pixel component values and an XOR operation between the blue and green pixel component values. Entry 520 corresponds to the 4BPP_8888 format which is the same format as entry 515 but without the color transform.

Entry 525 specifies the 4BPP_2101010_CT format which includes four bytes per pixel and two bits, 10 bits, 10 bits, and 10 bits for the four pixel components and has a color transform encoding. Entry 530 corresponds to the 4BPP_2101010_CT format which includes four bytes per pixel and 10 bits, 10 bits, 10 bits, and two bits for the four pixel components with a color transform. Entry 535 specifies the 4BPP_111110_CT format which includes four bytes per pixel and 11 bits, 11 bits, and 10 bits for the three pixel components (no alpha component) with a color transform. Entry 540 specifies the 4BPP_101111_CT format which includes four bytes per pixel and 10 bits, 11 bits, and 11 bits for the three pixel components with a color transform. Entry 545 corresponds to the 8BPP_16161616_CT format which includes eight bytes per pixel and 16 bits for each of the four pixel components with a color transform. Entry 550 specifies the 8BPP_16161616 format which includes four bytes per pixel and 16 bits for each the four pixel components without the color transform.

In one implementation, the graphics engine can choose to test for a subset of the formats listed in format table 500. For example, the graphics engine can use information associated with the data chunk to determine which formats are most likely to match the data chunk. For example, if the size of the data chunk is below a threshold, then the graphics engine can select only those formats to test for which would result in larger sizes of surfaces. In another example, if the data chunk was received from a particular source, the graphics engine can select only a subset of the formats based on which formats have been received previously from that particular source. Other techniques for selecting only a subset of the formats to test from format table 500 are possible and are contemplated.

Figure 6:
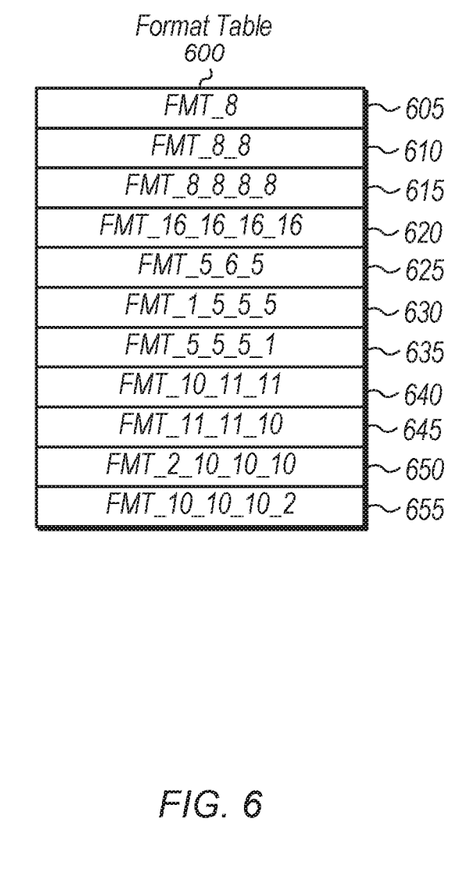
FIG. 6 is a format table in accordance with one implementation.

Turning now to FIG. 6, a format table 600 in accordance with one implementation is shown. In one implementation, format table 600 is loaded by a graphics engine for use in determining which formats to test for when processing a data chunk of unknown format. The different possible formats to be tested for are listed in format table 600. This list is representative of one particular implementation. In other implementations, the list of different possible formats can include other types and/or numbers of formats.

In one implementation, format table 600 is included in format tables 245 (of FIG. 2). In one implementation, the graphics engine tests the data chunk against the formats listed in format table 500 to generate a first score for each pixel depth. Also, the graphics engine tests the data chunk against the formats listed in format table 600 to generate a second score for each format (e.g., the organization of the pixel components). Then, the graphics engine generates a final score for each pixel depth and format combination based on the first and second scores. The graphics engine makes a prediction of the pixel depth and format of the data chunk based on the final scores generated for all of the formats. For example, in one implementation, the highest final score from the plurality of final scores is selected, and then the pixel depth and format combination corresponding to the highest final score is used as the prediction of the data chunk's pixel depth and format.

Entry 605 specifies the "FMT_8" format which encodes one byte per pixel. Entry 610 specifies the "FMT_8_8" format which encodes two bytes per pixel. Entry 615 specifies the "FMT_8_8_8_8" format which encodes one byte per pixel component for a total of four bytes per pixel. Entry 620 specifies the "FMT_16_16_16_16" format which encodes two bytes per pixel component for a total of eight bytes per pixel. Entry 625 specifies the "FMT_5_6_5" format which encodes five bits, six bits, and five bits for three pixel components for a total of two bytes per pixel.

Entry 630 specifies the "FMT_1_5_5_5" format which encodes one bit per alpha pixel component as the first pixel component being encoded and five bits for the pixel color components for a total of two bytes per pixel. Entry 635 specifies the "FMT_5_5_5_1" format which encodes five bits for the pixel color components and one bit per alpha pixel component as the last pixel component being encoded for a total of two bytes per pixel. Entry 640 specifies the "FMT_10_11_11" format which encodes 10 bits, 11 bits, and 11 bits for the three pixel color components for a total of four bytes per pixel. Entry 645 specifies the "FMT_11_11_10" format which encodes 11 bits, 11 bits, and 10 bits for the three pixel color components for a total of four bytes per pixel. Entry 650 specifies the "FMT_2_10_10_10" format which encodes two bits for the alpha component which is prior to the other components and ten bits per pixel color component for a total of four bytes per pixel. Entry 655 specifies the "FMT_10_10_10_2" format which encodes ten bits for the three pixel color components followed by two bits for the alpha component for a total of four bytes per pixel.

In one implementation, the graphics engine differentiates between the different formats listed in table 600 by detecting busy bits around channel boundaries. The graphics engine measures the changes in the least significant bits (LSBs) around the possible different channel boundaries for adjacent channels. Also, the graphics engine measures the number of changes in the most significant bits (MSBs) around the possible different channel boundaries for adjacent channels. In one implementation, the graphics engine adds the number of LSB changes while subtracting the number of MSB changes. The graphics engine generates a sum for the entirety of the data chunk for each different possible format, and then the graphics engine selects the highest sum from the plurality of sums. The format which generated the highest sum is used as a prediction of the data chunk's format in one implementation.

Figure 7:
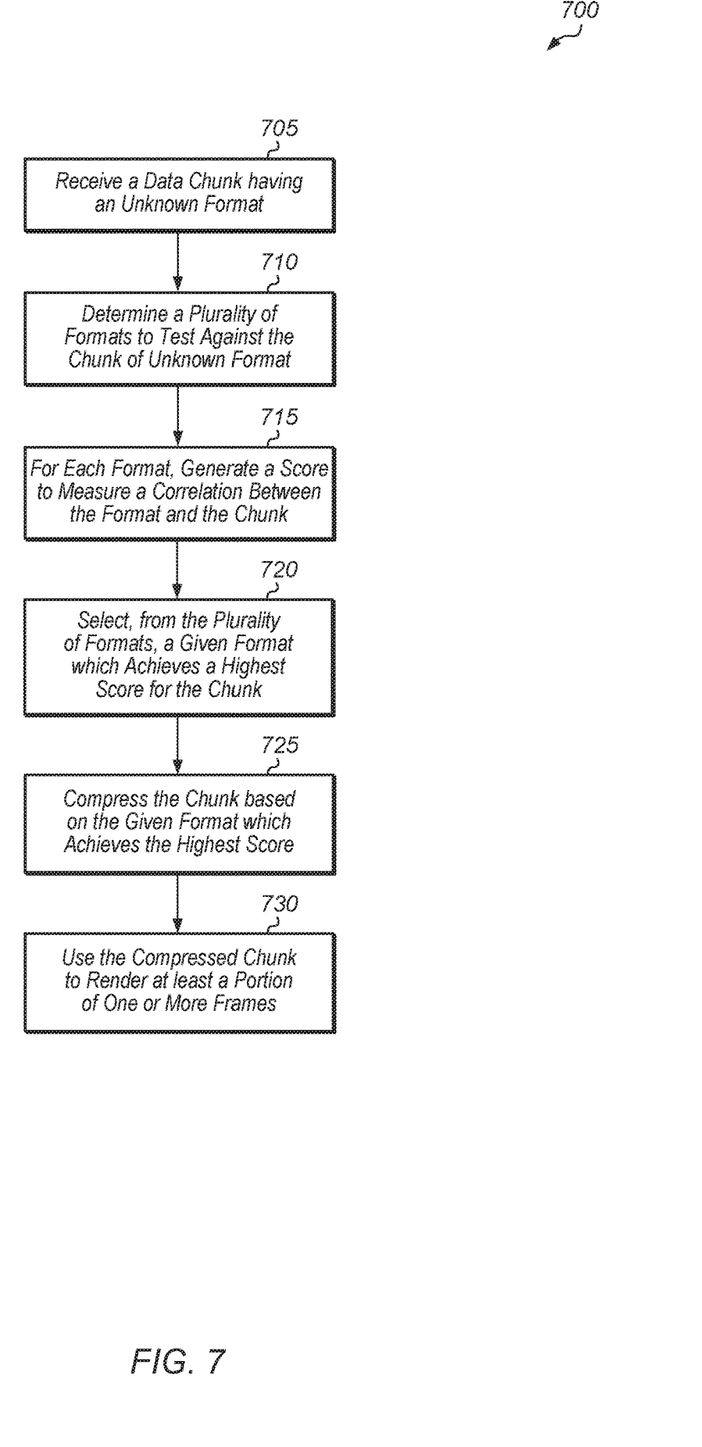
FIG. 7 is a generalized flow diagram illustrating one implementation of a method for performing automatic data format detection.

Turning now to FIG. 7, one implementation of a method 700 for performing automatic data format detection is shown. For purposes of discussion, the steps in this implementation and those of FIG. 8-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A graphics engine receives a data chunk having an unknown format (block 705). In response to receiving the data chunk, the graphics engine determines a plurality of formats to test against the chunk of unknown format (block 710). In one implementation, metadata defining the plurality of formats is stored by the graphics engine and retrieved in response to receiving the chunk of unformatted data. In another implementation, the graphics engine determines which formats to test against the data chunk in real-time on the fly. For example, in this implementation, if the graphics engine knows the size of the surface, then the graphics engine can select from a subset of possible formats based on which formats are most likely based on the size of the surface. For example, if the number of bits in the chunk is relatively large for the size of the surface, then the graphics engine can test for a higher number of bits per pixel (8 bytes per pixel or higher). Alternatively, if the number of bits in the chunk is relatively small for the size of the surface, then the graphics engine can test for a smaller number of bits per pixel (4 bytes per pixel or lower). In other implementations, other techniques for determining which formats to test against the chunk are possible and are contemplated.

Next, for each format of the plurality of formats determined in block 710, the graphics engine generates a score to measure a correlation between the format and the chunk (block 715). As a result of block 715, the graphics engine generates a plurality of scores to measure a correlation between a plurality of formats and the chunk of unformatted data. Then, the graphics engine selects, from the plurality of formats, a given format which achieves a highest score for the chunk (block 720). Next, the graphics engine compresses the chunk based on the given format which achieves the highest score (block 725). In other words, the graphics engine compresses the chunk based on the assumption that the chunk is formatted with the given format that achieves the highest score. At a later point in time, the graphics engine uses the compressed chunk to render at least a portion of one or more frames (block 730). The frames can be generated as part of a game, video, compute engine, or otherwise. In other implementations, the graphics engine uses the compressed chunk to render other types of image data. After block 730, method 700 ends.

Figure 8:
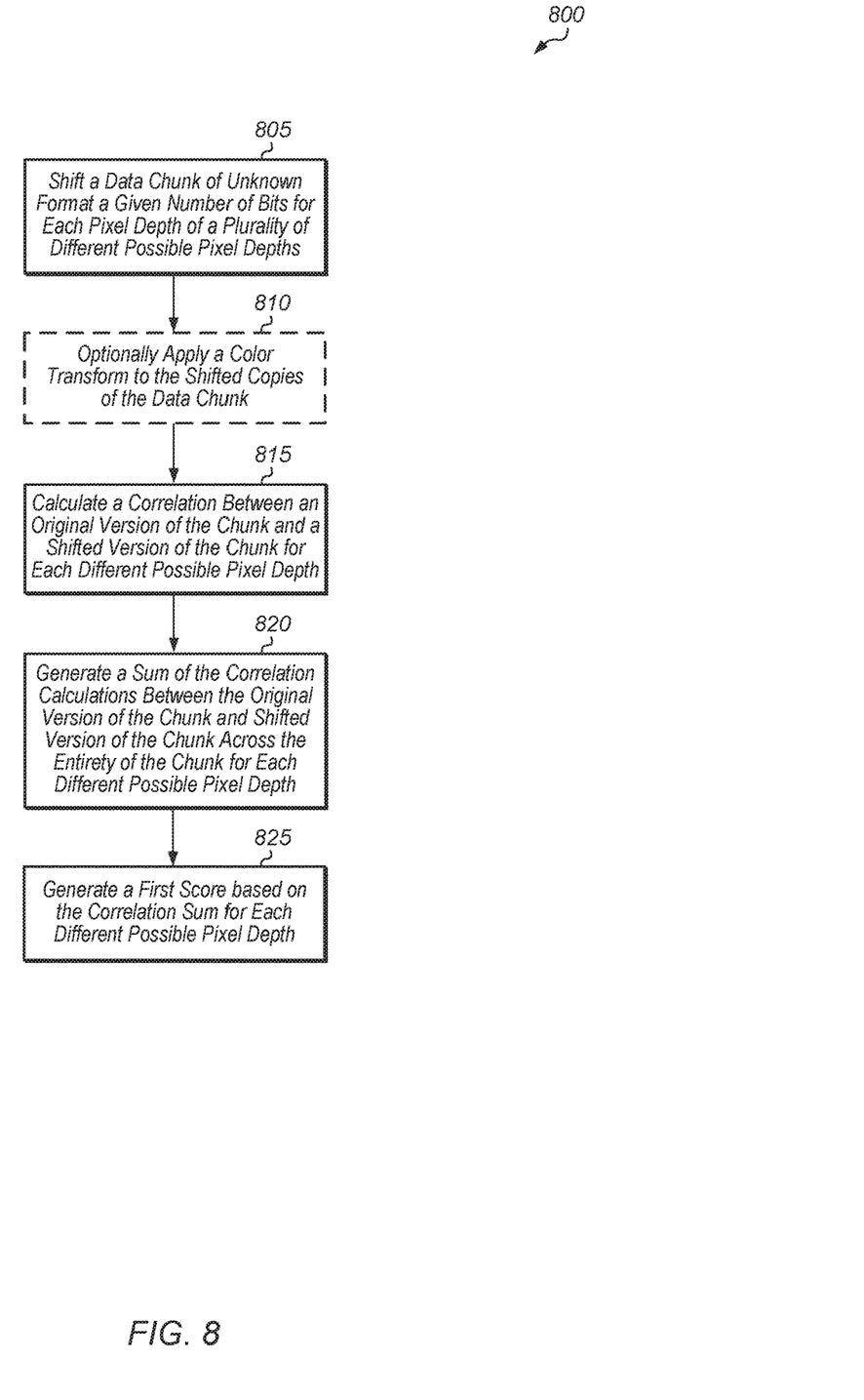
FIG. 8 is a generalized flow diagram illustrating one implementation of a method for detecting a pixel depth of a data chunk of unknown format based on performing data folding across different possible pixel boundaries.

Turning now to FIG. 8, one implementation of a method 800 for detecting a pixel depth of a data chunk of unknown format based on performing data folding across different possible pixel boundaries is shown. A graphics engine shifts a copy of a data chunk of unknown format a given number of bits for each pixel depth of a plurality of different possible pixel depths (block 805). For example, for a possible pixel depth of 4 bytes per pixel, the graphics engine shifts the chunk by 4 bytes. For a possible pixel depth of 8 bytes per pixel, the graphics engine shifts the chunk by 8 bytes. Any number of other bit-shifts are possible for other possible pixel depths. The number of different pixel depths in the plurality of pixel depths can vary from implementation to implementation. Also, the graphics engine optionally applies a color transform to the shifted copies of the data chunk (block 810). In one implementation, the graphics engine generates a first shifted copy of the data chunk without a color transform and a second shifted copy of the data chunk with a color transform for each pixel depth.

Next, the graphics engine calculates a correlation between an original version of the chunk and a shifted version of the chunk for each different possible pixel depth (block 815). For example, in one implementation, the graphics engine performs a bitwise XOR operation between the original version of the chunk and the shifted version of the chunk and then adds up the number of "1" bits (i.e., set bits). In other implementations, the graphics engine uses other suitable techniques for calculating the correlation between the original version of the chunk and the shifted version of the chunk. Then, the graphics engine generates a sum of the correlation calculations between the original version of the chunk and the shifted version of the chunk across the entirety of the chunk for each different pixel depth (block 820). Next, the graphics engine generates a first score based on the correlation sum for each different possible pixel depth (block 825). After block 825, method 800 ends.

Figure 9:
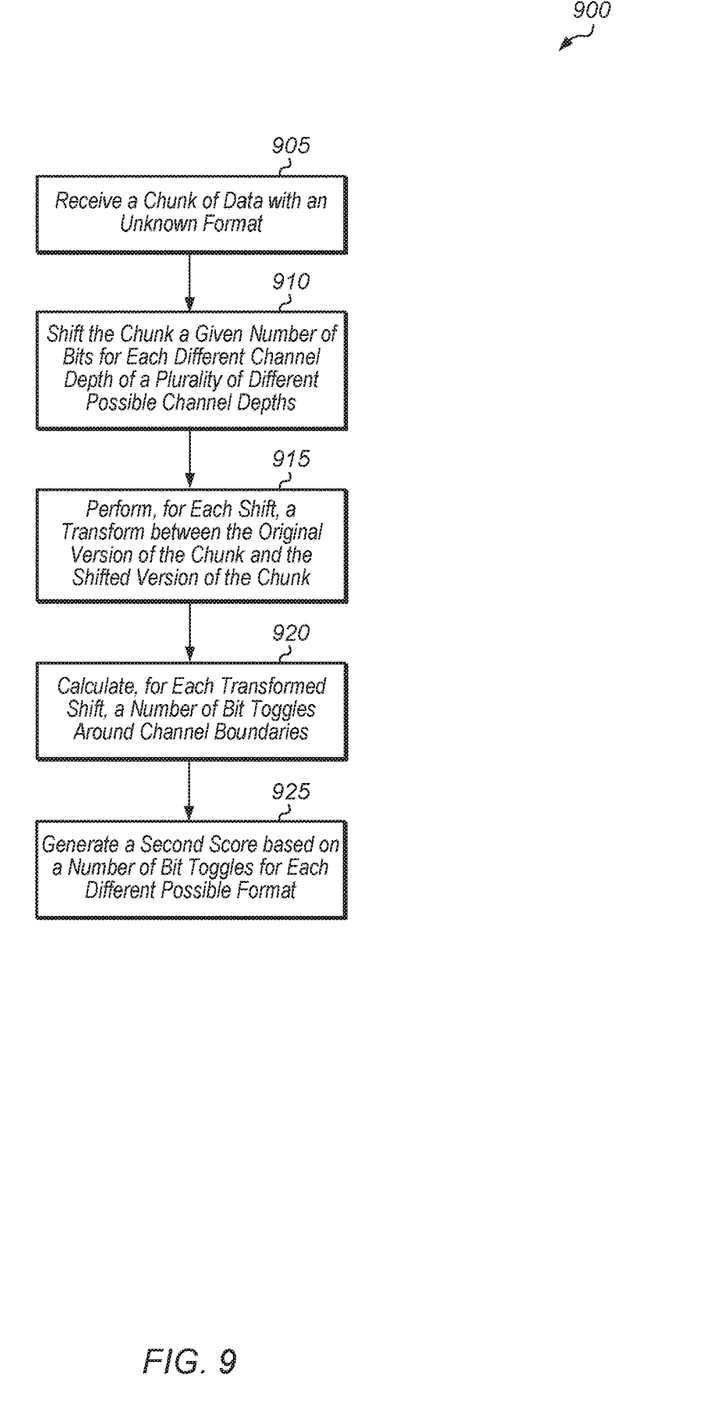
FIG. 9 is a generalized flow diagram illustrating one implementation of a method for determining a format of a data chunk with unknown format based on measuring busy bits across channel boundaries.

Referring now to FIG. 9, one implementation of a method 900 for determining a format of a data chunk with unknown format based on measuring busy bits across channel boundaries is shown. A graphics engine (e.g., graphics engine 210 of FIG. 2) receives a chunk of data with an unknown format (block 905). The graphics engine shifts the chunk a given number of bits for each different channel depth of a plurality of different possible channel depths (block 910). For example, a plurality of possible formats can have different numbers of bits per channel, and the graphics engine can perform a different shift for each of these possible different formats. For example, the graphics engine can shift the chunk by 5 bits, 8 bits, 10 bits, 11 bits, 12 bits, and so on. Any number of different shifts can be performed, with the number varying according to the implementation. As used herein, a "channel" is defined as a pixel component. For example, the different pixel components can include red, blue, green, and alpha.

Next, the graphics engine performs, for each shift, a transform between the original version of the chunk and the shifted version of the chunk (block 915). In one implementation, the transform is a bitwise-XOR operation. In other implementations, other types of transforms can be used in block 915. Then, the graphics engine calculates, for each transformed shift, a number of bit toggles around channel boundaries (block 920). For example, in one implementation, the graphics engine calculates the number of bit toggles by adding toggles of least significant bits and subtracting toggles of most significant bits around each channel boundary. Next, the graphics engine generates, for each shift, a second score based on the number of bit toggles for each different possible format (block 925). After block 925, method 900 ends.

In one implementation, method 900 is performed in parallel with method 800 (of FIG. 8). In another implementation, method 900 is performed subsequent to method 800 for a given chunk of data. In other words, for each different pixel depth and/or format combination, the graphics engine calculates a first score (in block 820) and a second score (in block 925). In some implementations, when method 900 is performed subsequent to method 800, a subset of formats can be tested for based on the bits per pixel determined by method 800. For example, if method 800 predicts that there are four bytes per pixel, method 900 can perform different shifts that are compatible with a four byte per pixel format.

Figure 10:
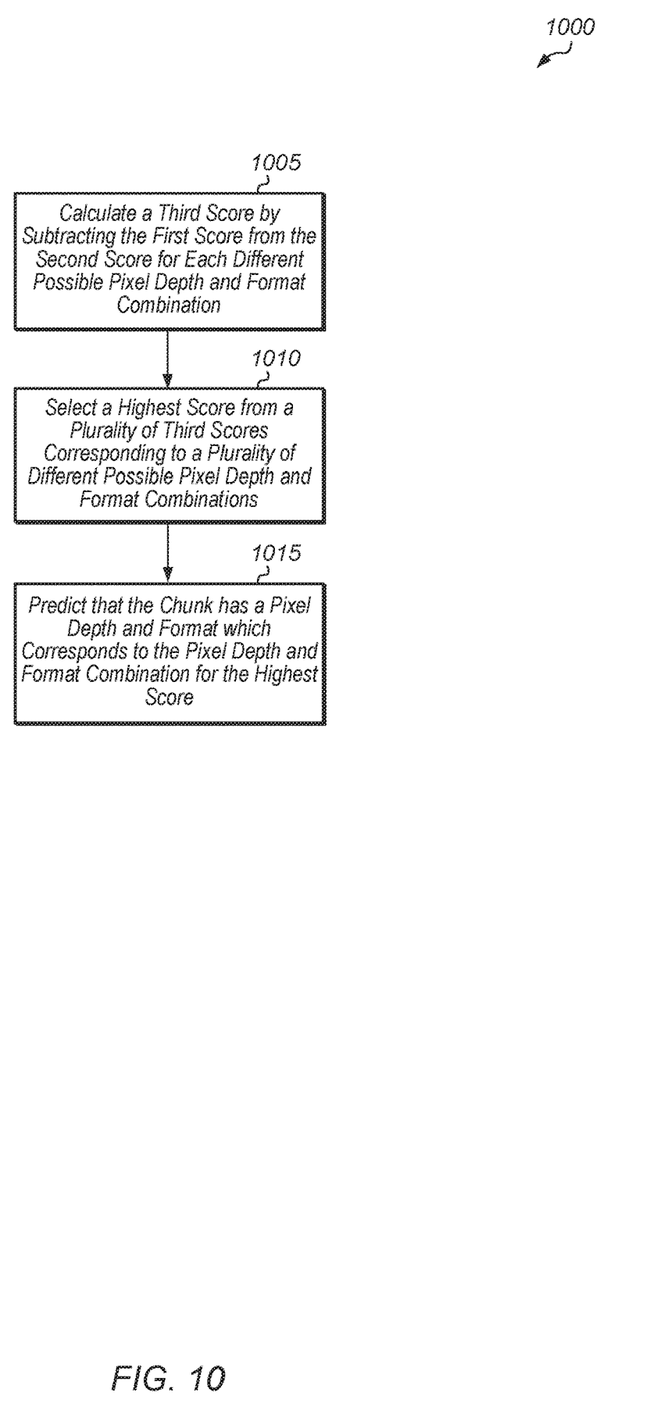
FIG. 10 is a generalized flow diagram illustrating one implementation of a method for predicting a pixel depth and format for a chunk of unformatted data.

Turning now to FIG. 10, one implementation of a method 1000 for predicting a pixel depth and format for a chunk of unformatted data is shown. It is noted that the discussion of method 1000 is intended to be a continuation of the discussion of methods 800 (of FIG. 8) and 900 (of FIG. 9). Accordingly, it is assumed that methods 800 and 900 have already been performed to calculate first and second scores for each different possible pixel depth and format, respectively. At the start of method 1000, a graphics engine calculates a third score by subtracting the first score from the second score for each different possible pixel depth and format combination (block 1005). Next, the graphics engine selects a highest score from a plurality of third scores corresponding to a plurality of different possible pixel depth and format combinations (block 1010). Then, the graphics engine predicts that the chunk has a pixel depth and format which corresponds to the pixel depth and format combination for the highest score (block 1015). After block 1015, method 1000 ends.

Figure 11:
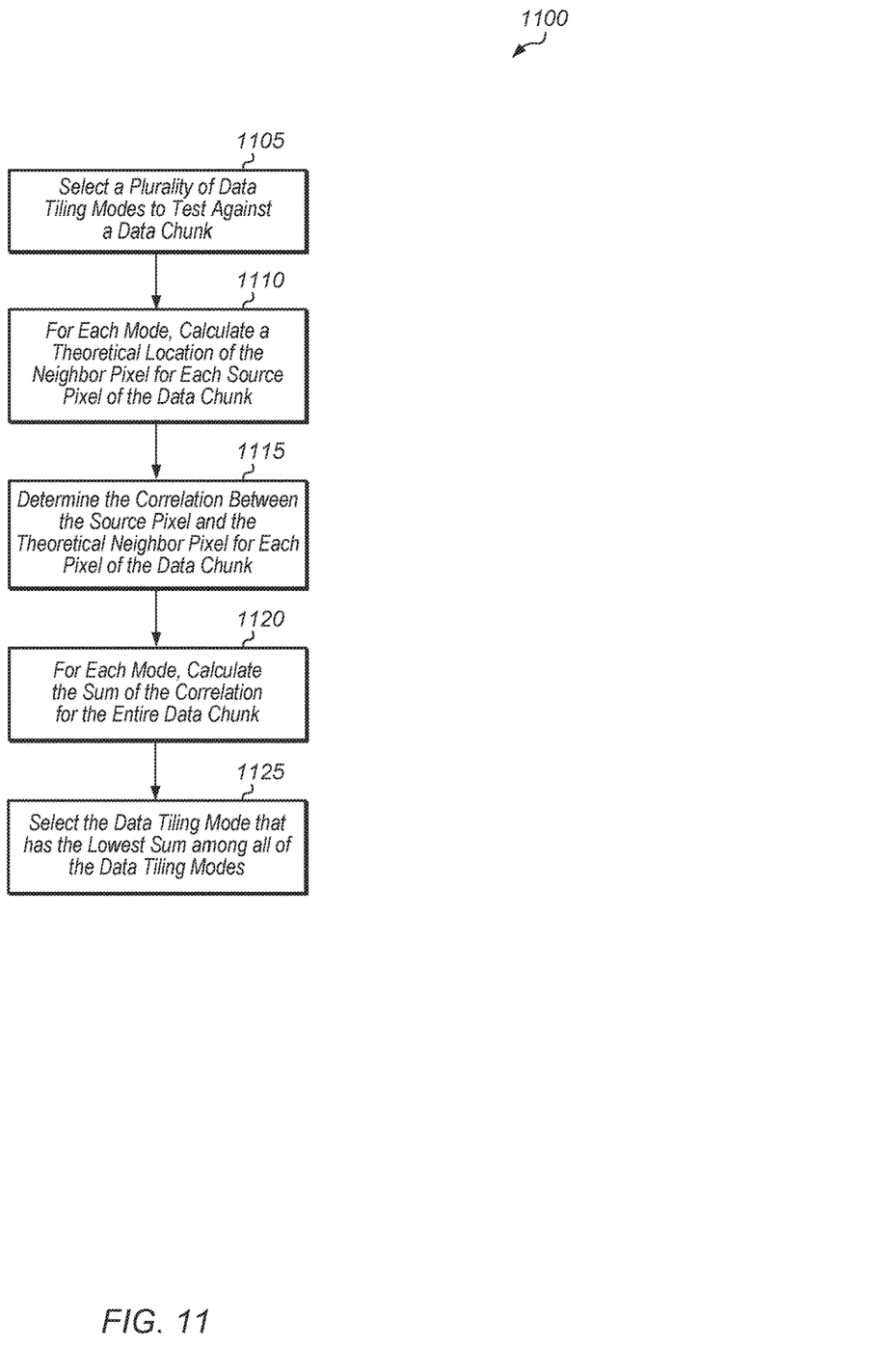
FIG. 11 is a generalized flow diagram illustrating one implementation of a method for detecting a data tiling mode of a data chunk.

Referring now to FIG. 11, one implementation of a method 1100 for detecting a data tiling mode of a data chunk is shown. It is assumed for the purposes of this discussion that methods 800, 900, and 1000 have already been performed prior to method 1100. Accordingly, when method 1100 is initiated, the pixel depth and format have already been predicted for a given data chunk. At the start of method 1100, a plurality of data tiling modes to test against a data chunk are selected (block 1105). The data tiling mode specifies how the data is organized in the horizontal and vertical directions (for two-dimensional data) in screenspace. For three-dimensional (3D) data, the data tiling mode specifies how the data is organized for the three different dimensions of 3D space.

The data tiling mode determines how a pixel in the screenspace maps to a memory index specifying where the pixel is stored in memory or within a buffer. For example, given the (x,y) value of a pixel in screenspace, the data tiling mode would map the (x,y) value to a memory address. The data tiling modes can include linear tiling, two-dimensional tiling, tree swizzle tiling, and so on. Generally speaking, the data tiling mode determines where the horizontal and vertical neighbors of a given pixel are stored within the memory layout of the data chunk. It is noted that the term "data tiling mode" can also be referred to herein as "memory layout", "micro-tiling mode", or "swizzle mode".

After block 1105, for each mode, the graphics engine calculates a theoretical location of the neighbor pixel for each source pixel of the data chunk (block 1110). Then, the graphics engine determines the correlation between the source pixel and the theoretical neighbor pixel for each pixel of the data chunk (block 1115). For example, the graphics engine performs an XOR operation between the source pixel and the theoretical neighbor pixel to calculate the correlation in block 1115. For each mode, the graphics engine calculates the sum of the correlation for the entire data chunk (block 1120). Next, the graphics engine selects the data tiling mode that has the lowest sum (i.e., highest correlation) among all of the data tiling modes (block 1125). After block 1125, method 1100 ends. As a result of performing method 1100, the graphics engine predicts that the data chunk has the data tiling mode that resulted in the lowest sum in block 1125. The graphics engine can then compress the data chunk based on the assumption that the data chunk is organized according to the predicted data tiling mode.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a memory storing a data chunk having an unknown format; and
    a graphics engine configured to:
        generate, for each format of a plurality of formats, a score to measure a correlation between the format and the data chunk;
        select a given format which achieves a highest score of the plurality of formats for the data chunk; and
        compress the data chunk based on the given format which achieves the highest score.

2. The apparatus as recited in claim 1, wherein to generate the plurality of scores for the plurality of formats, and wherein the graphics engine is configured to:
    detect a pixel depth of the data chunk based on performing data folding across different possible pixel boundaries; and
    detect a format of the data chunk based on detecting busy bits across different possible channel boundaries.

3. The apparatus as recited in claim 2, wherein to detect the pixel depth of the data chunk based on performing data folding across different possible pixel boundaries, the graphics engine is configured to:
    shift the data chunk a given number of bits for each pixel depth of a plurality of different possible pixel depths;
    calculate a correlation between an original version of the data chunk and a shifted version of the data chunk for each different possible pixel depth;
    generate a sum of the correlation between the original version of the data chunk and the shifted version across an entirety of the data chunk for each different pixel depth; and
    generate a first score based on the sum for each different possible pixel depth.

4. An apparatus as recited in claim 3, wherein the plurality of possible pixel depths comprise four bytes per pixel and eight bytes per pixel, and wherein the graphics engine is further configured to:
    perform a transform between the original version of the data chunk and a shifted version of the data chunk when calculating the correlation for each different possible pixel depth; and
    render at least a portion of a given frame using a compressed version of the data chunk.

5. An apparatus as recited in claim 3, wherein to detect a format of the data chunk based on detecting busy bits across different possible channel boundaries, the graphics engine is configured to:
    shift the data chunk a given number of bits for each different channel depth of a plurality of different possible channel depths;
    perform a transform between the original version of the data chunk and a shifted version of the data chunk for each shift;
    calculate a number of bit toggles around channel boundaries for each different possible format; and
    generate a second score based on the number of bit toggles for each different possible format.

6. The apparatus as recited in claim 5, wherein the graphics engine is configured to calculate the number of bit toggles by adding toggles of least significant bits and subtracting toggles of most significant bits around each channel boundary.

7. The apparatus as recited in claim 5, wherein the graphics engine is further configured to:
    calculate a third score by subtracting the first score from the second score for each different possible pixel depth and format combination;
    select a highest score from a plurality of third scores corresponding to a plurality of different possible pixel depth and format combinations;
    predict that the data chunk has a pixel depth and format which corresponds to the pixel depth and format combination of the highest score; and
    predict a data tiling mode for the data chunk from among a plurality of data tiling modes.

8. A method comprising:
    generating, by a graphics engine for each format of a plurality of formats, a score to measure a correlation between the format and a data chunk having an unknown format;
    selecting a given format which achieves a highest score of the plurality of formats for the data chunk; and
    compressing the data chunk based on the given format which achieves the highest score.

9. The method as recited in claim 8, wherein generating a plurality of scores for a plurality of formats comprises:
    detecting a pixel depth of the data chunk based on performing data folding across different possible pixel boundaries; and
    detecting a format of the data chunk based on detecting busy bits across different possible channel boundaries.

10. The method as recited in claim 9, wherein detecting the pixel depth of the data chunk based on performing data folding across different possible pixel boundaries comprises:

shifting the data chunk a given number of bits for each pixel depth of a plurality of different possible pixel depths;

calculating a correlation between an original version of the data chunk and a shifted version of the data chunk for each different possible pixel depth;

generating a sum of the correlation between the original version of the data chunk and the shifted version across an entirety of the data chunk for each different pixel depth; and generating a first score based on the sum for each different possible pixel depth.

11. The method as recited in claim 10, wherein the plurality of possible pixel depths comprise four bytes per pixel and eight bytes per pixel, and wherein the method further comprising:

performing a transform between the original version of the data chunk and a shifted version of the data chunk when calculating the correlation for each different possible pixel depth; and rendering at least a portion of a given frame using a compressed version of the data chunk.

12. The method as recited in claim 10, wherein to detect a format of the data chunk based on detecting busy bits across different possible channel boundaries, the method further comprising:

shifting the data chunk a given number of bits for each different channel depth of a plurality of different possible channel depths;

performing a transform between the original version of the data chunk and a shifted version of the data chunk for each shift;

calculating a number of bit toggles around channel boundaries for each different possible format; and generating a second score based on the number of bit toggles for each different possible format.

13. The method as recited in claim 12, further comprising calculating the number of bit toggles by adding toggles of least significant bits and subtracting toggles of most significant bits around each channel boundary.

14. The method as recited in claim 12, further comprising:

calculating a third score by subtracting the first score from the second score for each different possible pixel depth and format combination;

selecting a highest score from a plurality of third scores corresponding to a plurality of different possible pixel depth and format combinations;

predicting that the data chunk has a pixel depth and format which corresponds to the pixel depth and format combination of the highest score; and predicting a data tiling mode for the data chunk from among a plurality of data tiling modes.

15. A system comprising:

a memory storing a data chunk having an unknown format; and a processor coupled to the memory, wherein the processor is configured to:

generate, for each format of a plurality of formats, a score to measure a correlation between the format and the data chunk;

select a given format which achieves a highest score of the plurality of formats for the data chunk;

compress the data chunk based on the given format which achieves the highest score; and render at least a portion of one or more frames based on a compressed version of the data chunk.

16. The system as recited in claim 15, wherein to generate a plurality of scores for a plurality of formats, the processor is configured to:

detect a pixel depth of the data chunk based on performing data folding across different possible pixel boundaries; and detect a format of the data chunk based on detecting busy bits across different possible channel boundaries.

17. The system as recited in claim 16, wherein to detect the pixel depth of the data chunk based on performing data folding across different possible pixel boundaries, the processor is configured to:

shift the data chunk a given number of bits for each pixel depth of a plurality of different possible pixel depths;

calculate a correlation between an original version of the data chunk and a shifted version of the data chunk for each different possible pixel depth;

generate a sum of the correlation between the original version of the data chunk and the shifted version across an entirety of the data chunk for each different pixel depth; and generate a first score based on the sum for each different possible pixel depth.

18. The system as recited in claim 17, wherein the plurality of possible pixel depths comprise four bytes per pixel and eight bytes per pixel, and wherein the processor is further configured to perform a transform between the original version of the data chunk and a shifted version of the data chunk when calculating the correlation for each different possible pixel depth.

19. The system as recited in claim 17, wherein to detect a format of the data chunk based on detecting busy bits across different possible channel boundaries, the processor is configured to:

shift the data chunk a given number of bits for each different channel depth of a plurality of different possible channel depths;

perform a transform between the original version of the data chunk and a shifted version of the data chunk for each shift;

calculate a number of bit toggles around channel boundaries for each different possible format; and generate a second score based on the number of bit toggles for each different possible format.

20. The system as recited in claim 19, wherein the processor is further configured to calculate the number of bit toggles by adding toggles of least significant bits and subtracting toggles of most significant bits around each channel boundary.

* * * * *